(12) United States Patent
Berg et al.

(10) Patent No.: US 8,359,259 B2
(45) Date of Patent: Jan. 22, 2013

(54) SYSTEM AND METHOD FOR ADMINISTERING TELEMATICS BASED REINSURANCE POOLS

(75) Inventors: Gregory H. Berg, New Haven, CT (US); Andrew J. Amigo, Gloucester, MA (US); David F. Peak, Avon, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 291 days.

(21) Appl. No.: 12/617,152

(22) Filed: Nov. 12, 2009

(65) Prior Publication Data

US 2011/0112870 A1    May 12, 2011

(51) Int. Cl.
*G06Q 40/00* (2006.01)
(52) U.S. Cl. ............................................. 705/37
(58) Field of Classification Search ........... 705/4
See application file for complete search history.

(56) References Cited

U.S. PATENT DOCUMENTS

| | | | |
|---|---|---|---|
| 6,049,773 A | 4/2000 | McCormack et al. | |
| 6,868,386 B1 | 3/2005 | Henderson et al. | |
| 7,080,020 B1 | 7/2006 | Klaus | |
| 7,610,210 B2 | 10/2009 | Helitzer et al. | |
| 2002/0046066 A1 | 4/2002 | Laurenzano | |
| 2003/0135395 A1 | 7/2003 | Carfi et al. | |
| 2005/0102168 A1* | 5/2005 | Thomas et al. | 705/4 |
| 2006/0053038 A1 | 3/2006 | Warren et al. | |
| 2006/0173720 A1 | 8/2006 | Berens et al. | |
| 2006/0253307 A1 | 11/2006 | Warren et al. | |
| 2007/0027726 A1 | 2/2007 | Warren et al. | |
| 2007/0257815 A1* | 11/2007 | Gunderson et al. | 340/903 |
| 2007/0282641 A1 | 12/2007 | Thomas et al. | |
| 2008/0065427 A1* | 3/2008 | Helitzer et al. | 705/4 |
| 2008/0077451 A1 | 3/2008 | Anthony et al. | |
| 2009/0112907 A1 | 4/2009 | Mukherjee et al. | |
| 2009/0248454 A1* | 10/2009 | Amigo et al. | 705/4 |

* cited by examiner

*Primary Examiner* — Jessica Lemieux
(74) *Attorney, Agent, or Firm* — Buckley, Maschoff & Talwalkar LLC

(57) ABSTRACT

A data processing system includes a processor that is configured for determining a percentage share to assign a share of relative risk in an insurance pool between an insurer, a first safety vendor and at least one other safety vendor. The processor is further configured to allocate portions of the insurance pool among the insurer and the safety vendors according to the determined shares assigned to the insurer and the safety vendors, to aggregate by the insurer loss information related to the insurance pool, and transmit the loss information to the safety vendors. Also, the processor is configured to allocate portions of a claim liability or a received premium associated with the insurance pool among the insurer and the safety vendors according to the determined shares assigned to the insurer and the safety vendors. The data processing system also includes a memory for storing the determined shares assigned to the insurer and the safety vendors.

15 Claims, 12 Drawing Sheets

SYSTEM AND METHOD FOR ADMINISTERING TELEMATICS BASED REINSURANCE POOLS

FIELD

The present invention relates to risk management systems and practices that rely on electronic monitoring of motor vehicle operations.

BACKGROUND

Telematics is a rapidly growing field in connection with risk management for fleets of motor vehicles. Telematics entails installation of one or more sensors on a motor vehicle for the purpose of monitoring the use and/or condition of the motor vehicle. The telematics sensor data may relate, for example, to the vehicle's speed, location, acceleration, etc. The data generated and/or collected by the sensors is transmitted by telecommunications (e.g., via satellite and/or a cellular telephone network) to a central computer. The central computer stores, compiles and analyzes the sensor data to provide information that may be used for driver evaluation, risk management, and/or insurance policy underwriting, among other applications.

According to another typical aspect of telematics systems, sensor data may be provided as an input to an onboard computing device. The onboard computing device may drive an output device to provide warnings or other feedback to the driver when unsafe operation is occurring.

A number of existing companies function as telematics vendors. As is familiar to those who are skilled in the art, a telematics vendor supplies and/or installs telematics sensors, and/or receives and stores the telematics sensor data and provides reports about vehicle operation based on the telematics sensor data.

Like any supplier of services, a telematics vendor has incentives to provide effective services based on a desire for continued business engagements and for a good reputation. The present inventors have now recognized a need to still more strongly align the interests of telematics vendors with vehicle fleet operators and/or insurers.

SUMMARY

An apparatus, method, computer system and computer-readable data storage medium are disclosed which include determining a percentage share to assign of relative risk in an insurance pool between an insurer, a first safety vendor and at least one other safety vendor. The apparatus, method, computer system and computer-readable data storage medium also include allocating portions of the insurance pool among the insurer and the safety vendors according to the determined shares assigned to the insurer and the safety vendors. The apparatus, method, computer system and computer-readable data storage medium also include aggregating by the insurer, loss information related to the insurance pool. The apparatus, method, computer system and computer-readable data storage medium also include transmitting the loss information to the safety vendors, and allocating portions of a claim liability or a received premium associated with the insurance pool among the insurer and the safety vendors according to the determined shares assigned to the insurer and the safety vendors.

Because the safety vendors (e.g., telematics vendors) participate in the risks insured by the insurance policies, the safety vendors' interests are more tightly aligned with the insured and with the insurance company, which may lead to enhanced and more comprehensive risk management services for the insured.

With these and other advantages and features of the invention that will become hereinafter apparent, the invention may be more clearly understood by reference to the following detailed description of the invention, the appended claims, and the drawings attached hereto.

DETAILED DESCRIPTION

In general, and for the purposes of introducing concepts of embodiments of the present invention, a telematics vendor participates in insured risks for a fleet of motor vehicles via a reinsurance treaty. The reinsurance treaty may cede risks under the fleet insurance policy to a captive reinsurer that is at least partially owned by the telematics vendor. In some embodiments, other ownership interests in the captive reinsurer may be held by the operator of the motor vehicle fleet and/or by a managing general agent that is affiliated with the primary insurer that issued the fleet insurance policy. Losses ceded to the captive reinsurer are reflected in data provided to the captive reinsurer and to the telematics vendor. The telematics vendor may use the ceded loss data to refine its analysis of telematics sensor data.

Figure 1:
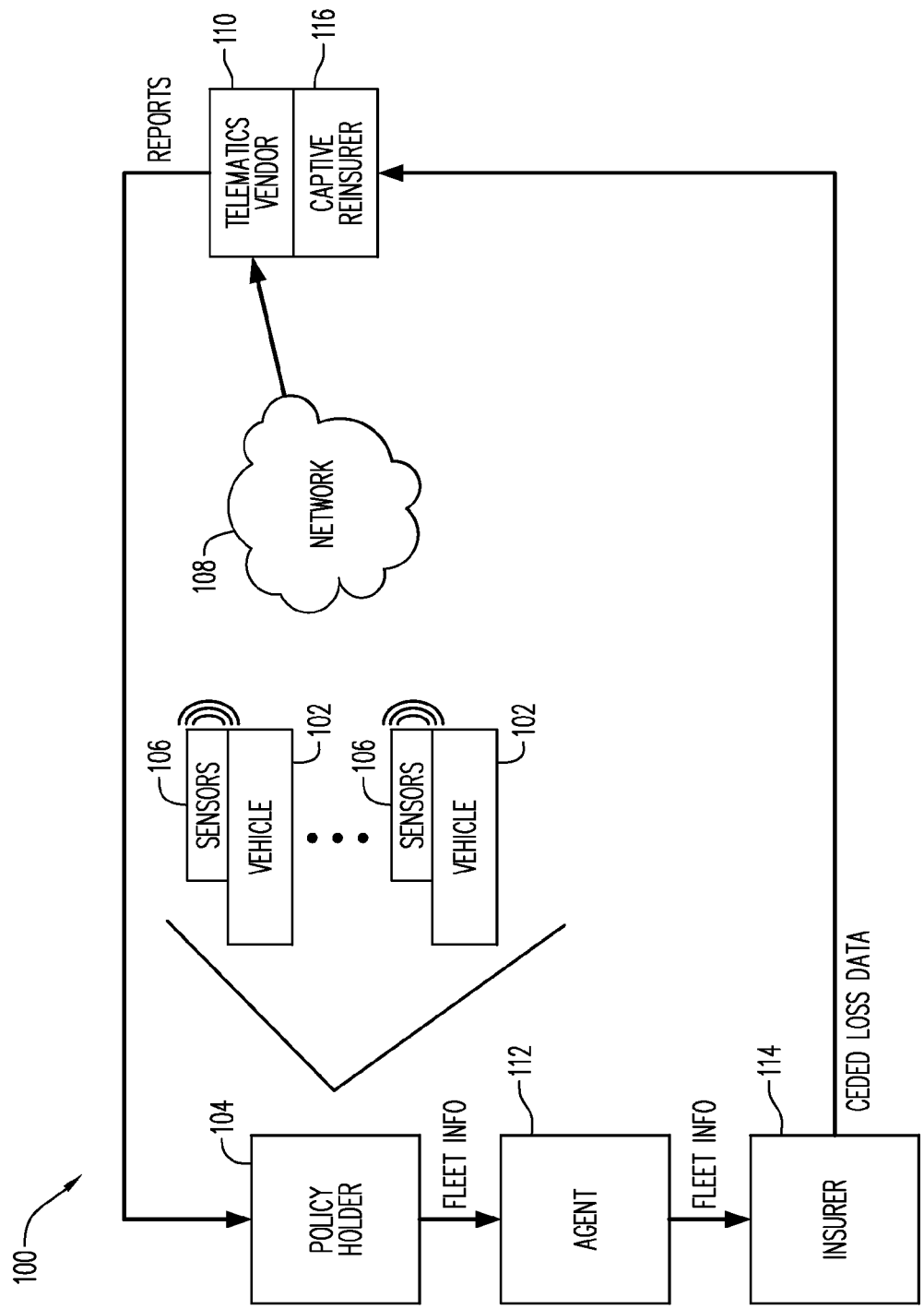
FIG. 1 is a block diagram of a system provided according to aspects of the present invention.

FIG. 1 is a block diagram of a system 100 provided according to aspects of the present invention. The system 100 includes a fleet of motor vehicles 102. The motor vehicles 102 may be of any type, including for example over-the-road trucks, passenger cars, taxis, local delivery vans, etc. The motor vehicles 102 need not be road vehicles, but may alternatively be watercraft or aircraft. The fleet of motor vehicles 102 is operated by a fleet operator which is a policy holder (or prospective policy holder) and which is represented by block 104 in FIG. 1.

In accordance with conventional practices, one or more telematics sensors 106 are installed on each of the motor vehicles 102. Blocks 106 are also intended to represent, in addition to the sensors themselves, one or more devices that transmit sensor data, via a telecommunications network 108, to a telematics vendor 110.

The telematics vendor 110 is an entity that supplies and/or installs telematics sensors, and/or receives and stores the telematics sensor data and provides reports about vehicle operation based on the telematics sensor data. In addition, the telematics vendor may perform additional functions as described below. The telematics sensor data may relate, for example, to the vehicle's speed, location, acceleration, deceleration, environmental conditions (e.g., presence of icy roads or precipitation), times of operation, tire pressure, engine use time, and vehicle diagnostic information. As used herein, the term "telematics sensor" may also refer to sensing systems which detect vehicles ahead of or behind the vehicle which carries the sensor, and/or sensors which detect that the vehicle is straying from the proper lane of travel. In addition, or alternatively, the telematics sensors supplied, installed and/or monitored by the telematics vendor may be installed in a building to monitor conditions in or around the building. In addition, or alternatively, the telematics sensors supplied, installed and/or monitored by the telematics vendor may be worn by a human being and used to monitor movements of the human being for the purposes of guiding the human being to perform job activities in a safe manner. The telematics sensors 106 may all be conventional and may operate in a conventional manner to provide one or more of the types of telematics sensor data referred to above. The telecommunications network 108 may also be conventional.

Also included in the system 100 is an insurance agent 112 which receives from the policy holder 104 information concerning the fleet of motor vehicles 102 operated by the policy holder 104. (However, in alternative embodiments of the system 100, there may be no agent representing the insured—i.e., the insured may deal directly with the insurer—or there may be more than one insurance agent participating in the system 100.) Still further, the system 100 includes an insurance company 114 which, in turn, receives from the insurance agent 112 the motor vehicle fleet information which originated from the policy holder 104. The insurance company 114 issues a property/casualty insurance policy which covers the fleet of motor vehicles 102. The insurance policy may be conventional, but in some embodiments of the invention may also be bundled with other services, as explained below. The insurance company 114 may also be referred to as the "primary insurer" or simply as the "insurer".

Still further, and in accordance with aspects of the present invention, the system 100 includes a captive reinsurance company 116 which may be at least partially owned by the telematics vendor 110. The captive reinsurance company 116 may be referred to as a "reinsurer".

Figure 1A:
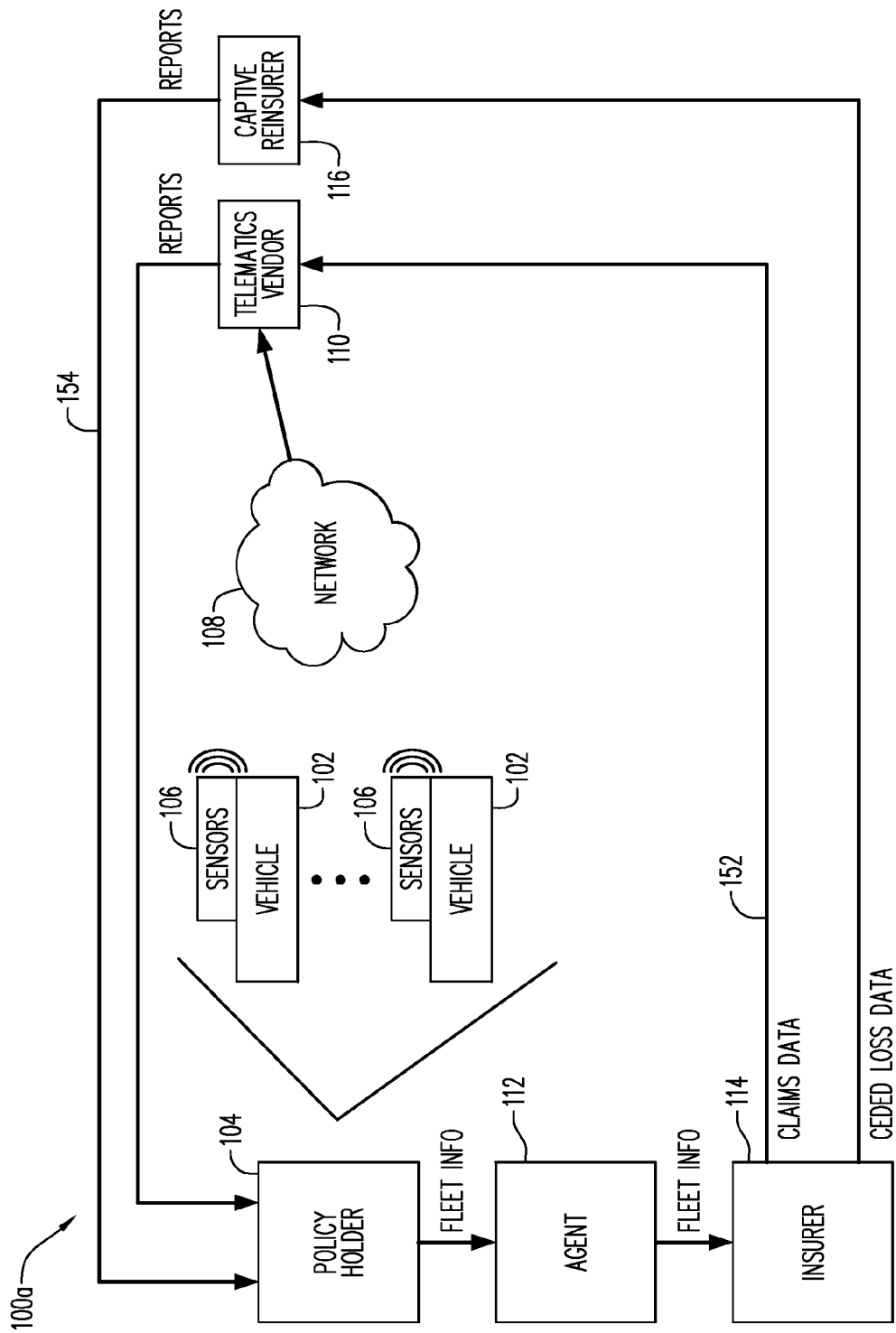
FIG. 1A is a block diagram of an alternative embodiment of the system of FIG. 1.

FIG. 1A is a block diagram of an alternative embodiment of the system shown FIG. 1. In FIG. 1A, the system is generally indicated by reference numeral 100a. In the system 100a shown in FIG. 1A, all the system components shown in FIG. 1 are again present, and need not be described again in detail. However, the flow of information may be somewhat different in the system 100a as compared to the system 100 shown in FIG. 1. In particular, in the system 100a, the insurer 114 may provide data concerning claims received relative to the primary policy directly to the telematics vendor 110, as indicated at 152 in FIG. 1A. Moreover, the captive reinsurer 116 may provide reports directly to the policy holder/insured/fleet operator 104, as indicated at 154 in FIG. 1A.

Figure 2:
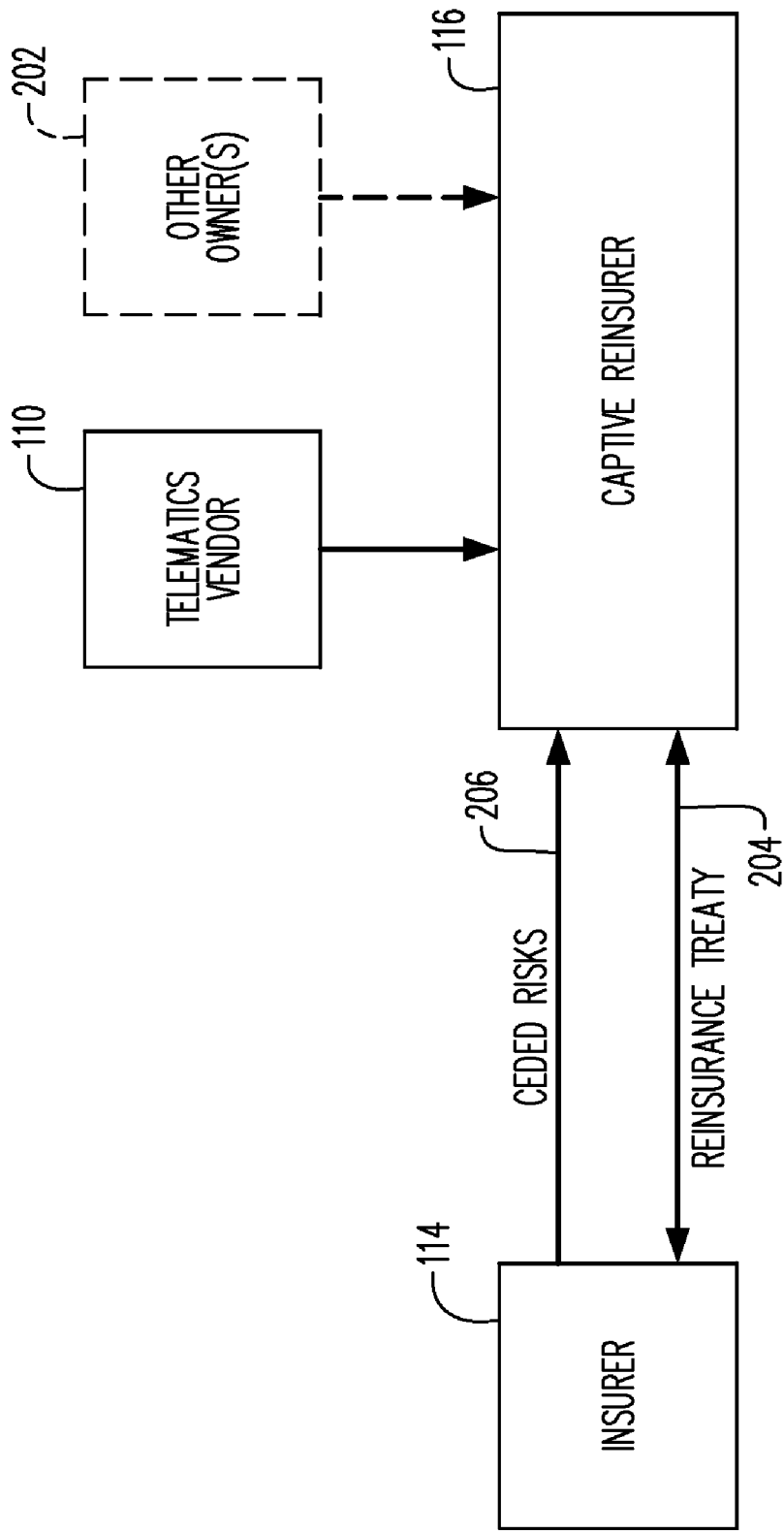
FIG. 2 is a block diagram that illustrates aspects of the system of FIG. 1.

FIG. 2 is a block diagram that illustrates aspects of the system 100 depicted in FIG. 1. As diagrammatically illustrated in FIG. 2, the telematics vendor 110 holds at least a partial ownership interest in the captive reinsurance company 116. Also indicated in phantom by block 202 in FIG. 2 are other entities that may hold one or more partial ownership interests in the captive reinsurance company 116. In descriptions which are set forth below concerning embodiments of the invention, various ownership structures for the captive reinsurance company 116 will be enumerated.

As indicated at 204 in FIG. 2, the primary insurer 114 and the captive reinsurance company 116 enter into a reinsurance contract under which at least some risks under the insurance policy on the motor vehicle fleet are ceded to the captive reinsurance company 116. Arrow 206 in FIG. 2 represents the cession of the risks under the primary policy to the captive reinsurance company 116. Reinsurance should be understood to include all known types of reinsurance arrangements including but not limited to, quota share, excess of loss, facultative, and per risk.

In the context of reinsurance, ceding a risk means to pass on to the reinsurer all or part of the insurance written by a primary insurer with the object of reducing the possible liability of the primary (or ceding) insurer. A cession may accordingly be the whole or a portion of single risks, defined policies, or a defined division of business, all as agreed in the reinsurance contract (also referred to as the reinsurance treaty). In order to trigger the reinsurance contract the primary insurer must perform the act of ceding which, in the context of a reinsurance treaty, generally entails the primary insurer reporting to the reinsurer the qualifying risks bound under the terms of the treaty. In addition, the ceding insurer must pay to the reinsurer a portion of the premium commensurate with the liability assumed by the reinsurer.

A particular numerical example of reinsurance will now be provided.

In the treaty context, a reinsurer agrees in advance to assume part of the risks underwritten. In a quota share treaty, a reinsurer's participation is usually determined by fixed percentages. For example, a primary insurer underwrites a risk providing $1,000,000 in coverage to an insured. The primary insurer's policy contains a deductible of $100,000 that the insured is responsible for paying. The primary insurer then reinsures 50% of its exposure of $900,000 ($1,000,000–$100,000 deductible) to the captive reinsurer. The captive reinsurer assumes a 50% proportional share of the $900,000 liability. In the event of a $500,000 loss, the insured would pay the first $100,000 and the primary insurer and the captive reinsure would each pay its 50% proportional share of the loss or $200,000.

If the premium for the $1,000,000 policy is $100,000, the primary and the captive reinsurer would split the total net premium according to the quota share percentages, 50/50. The premium shared is net of acquisition costs, commissions to the agent, taxes, etc.

Each of the blocks 104, 110, 112, 114 and 116 shown in FIG. 1, in addition to representing a respective entity, should also be understood as representing one or more computers operated by or on behalf of the respective entity. Data communications may be exchanged as needed among at least some of the computers referred to in the preceding sentence.

Various example ownership structures and interrelationships among entities, in accordance with example embodiments of the invention, will now be described.

For example, the managing general agency (represented by block 112 in FIG. 1) may be wholly owned by a holding company (not separately shown). In some embodiments, the holding company may be owned 40% by the primary insurer 114, 40% by one or more telematics vendors (including the telematics vendor 110 represented in FIGS. 1 and 2), and 20% by the management of the holding company/managing general agency.

The holding company may provide corporate center services, and relationship management with issuing carriers, telematics vendors and insurance producers (agents and brokers).

The managing general agency 112 may exercise underwriting authority for commercial automobile liability insurance for large fleets of vehicles. The managing general agency 112 may obtain field and service center sales and pre-underwriting services under contract with the primary insurer 114. Further, the managing general agency 112 may provide a full suite of fleet cost control services to operators (insureds) of the fleets of vehicles. The cost control services may include accident prevention, fuel cost management and vehicle maintenance cost management. These services may be integrated with services provided to the insureds by one or more telematics vendors with respect to data gathering and reporting. In addition, the managing general agency 112 pays commissions to the insurance producers.

The captive reinsurance company 116 may be 65% owned by the management of the holding company/managing general agency and 35% owned by one or more telematics vendors (including the telematics vendor 110). The captive reinsurance company 116 may assume quota share reinsurance from the primary insurer 114 on all policies underwritten by the managing general agency 112. This aligns underwriting interests between the managing general agency 112 and the primary insurer. In some embodiments, for example, the assumed quota share may be 50% of the first $500,000 per accident. The captive reinsurance company 116 may pay a ceding commission to the managing general agency 112 in consideration of the production of the primary insurance business.

The primary insurer 114 pays commissions to the managing general agency 112 and is responsible for policy issuance and claims management. For loss sensitive policies (i.e., policies on which the insured retains risk) the insured may choose to use a third-party claims administrator that is on an approved list maintained by the primary insurer 114.

The telematics vendor or vendors (such as the telematics vendor 110 represented in FIGS. 1 and 2) provides sensors/data transmission devices and associated reporting services to the fleet operators/insureds. The telematics vendor(s) also provide integration of data gathering and reporting with the overall fleet cost control services program offered by the managing general agency 112.

The insurance producers (not shown) may be a limited number of agents and brokers authorized to produce business to be underwritten by the managing general agency 112. The insurance producers may submit business directly to the managing general agency 112.

In some embodiments, the primary insurer 114 which partially owns the managing general agency 112 may issue less than all of the policies underwritten by the managing general agency 112. One or more other issuing carrier may issue other fleet liability policies underwritten by the managing general agency 112.

In some embodiments, the primary insurer 114 which partially owns the managing general agency 112 may use several alternative reinsurers, including the captive reinsurance company 116 represented in FIGS. 1 and 2. These alternative reinsurers may include single owner captive reinsurance companies owned by large corporations.

In some embodiments, a "syndication" approach may be used on some or all of the primary policies, with two or more issuing carriers participating on a single primary policy.

In some embodiments, the captive reinsurance company 116 may be a "group captive" at least partially owned by the fleet operators/insureds. In this case, for example, the cession to the captive reinsurer may be 30% of the first $250,000 of each loss. This may align the risk control interests of the insureds and the primary insurer.

Alternatively, the captive reinsurance company 116 may be an "agency captive" at least partially owned by the insurance producers.

In some embodiments, one or more unions that represent the insured's drivers may own an interest in the captive reinsurer.

In some embodiments, the managing general agency 112 works only with a single telematics vendor, which may own 100% of the captive reinsurance company 116. The cession to the captive reinsurer may be 30% of the first $250,000 of each loss. This may align the risk control interests of the telematics vendor and the primary insurer.

In some embodiments, private equity investors may make investments in the holding company.

An example business process flow for the ownership/interrelationship structure set forth above will be described below in connection with FIG. 4.

In the ownership/interrelationship structure set forth above, the primary insurer 114 may receive income as its share of income earned by the managing general agency 112 in commissions and in fees for fleet cost control services. The primary insurer may further receive underwriting and investment income on the premiums (net of reinsurance) from policies underwritten by the primary insurer. Still further, the primary insurer may receive ceding commissions from the captive reinsurance company 116, and contractual fee income for field and service center sales and pre-underwriting.

The telematics vendor 110 may receive income as its share of income earned by the managing general agency 112 in commissions and in fees for fleet cost control services. Further income for the telematics vendor 110 may come from sale or lease of telematics devices and from the telematics vendor's share of underwriting and investment income of the captive reinsurance company 116.

The management of the holding company/managing general agency may receive income from their share in the income of the managing general agency 112 in commissions and in fees for fleet cost control services, and in their share of underwriting and investment income of the captive reinsurance company 116.

Other issuing carriers, if present, may receive underwriting income and investment income on the premiums, net of reinsurance, on the policies they issue.

In some embodiments, as an alternative to the captive reinsurer described above, one or more entities (e.g., one or more telematics vendors) may each obtain ownership of a segregated accounting cell in a so-called "rent-a-captive" offshore reinsurer, and via the segregated accounting cell may receive a cession of risk under the primary policy or policies.

Figure 3:
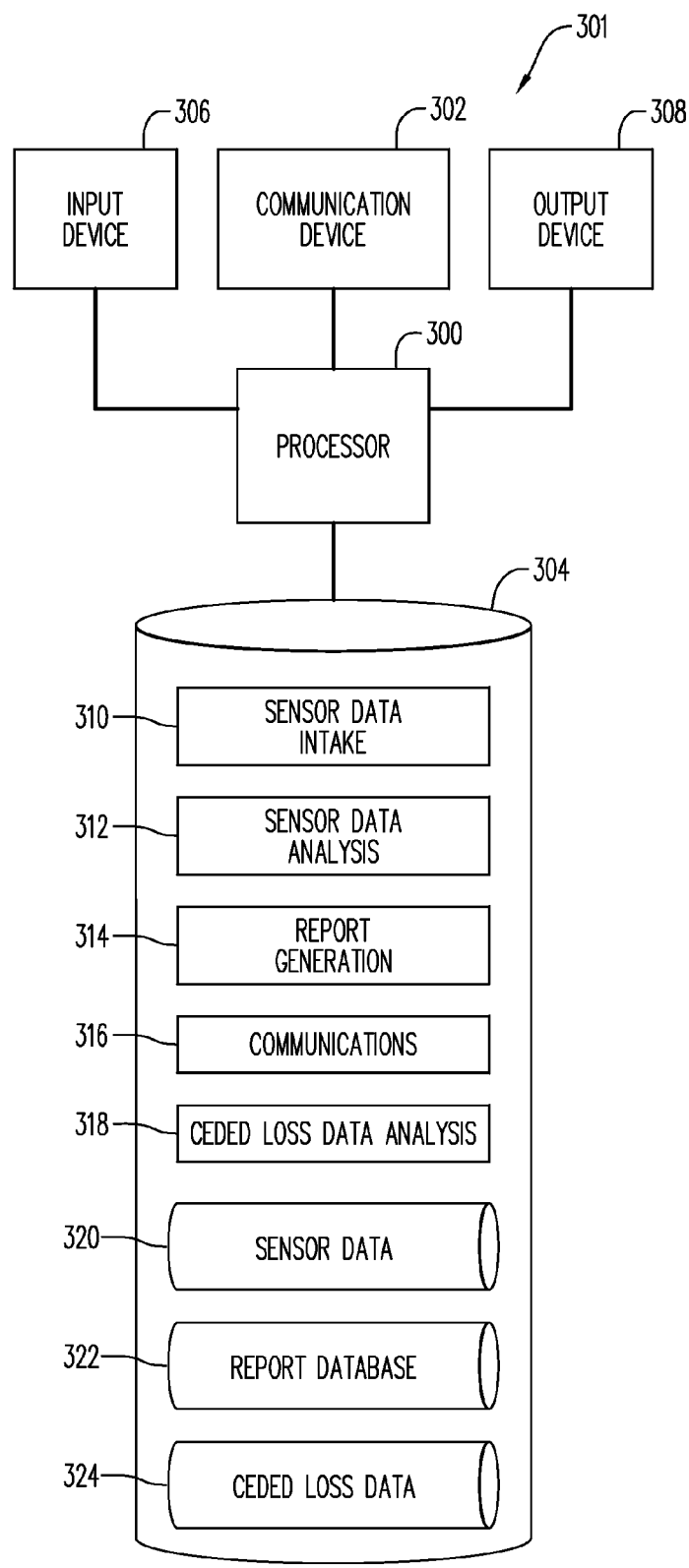
FIG. 3 is a block diagram representation of a computer that implements a portion of the system of FIG. 1.

FIG. 3 is a block diagram representation of a computer 301 operated by or on behalf of the telematics vendor 110 and or the captive reinsurance company 116. Hereinafter, the computer illustrated in FIG. 3 will be referred to as the "telematics vendor computer 301".

As depicted, the telematics vendor computer 301 includes a computer processor 300 operatively coupled to a communication device 302, a storage device 304, one or more input devices 306 and one or more output devices 308.

Communication device 302 may be used to facilitate communication with, for example, other devices (such as sensors 106 and/or computers operated by the policy holder 104, the primary insurer 114 and/or other entities depicted in FIG. 1). Continuing to refer to FIG. 3, the input device(s) 306 may comprise, for example, a keyboard, a keypad, a mouse or other pointing device, a microphone, knob or a switch, an infra-red (IR) port, a docking station, and/or a touch screen. The input device(s) 306 may be used, for example, to enter information. Output device(s) 308 may comprise, for example, a display (e.g., a display screen), a speaker, and/or a printer.

Storage device 304 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices. At least some of these devices may be considered computer-readable storage media, or may include such media.

In some embodiments, the hardware aspects of the telematics vendor computer 301 may be entirely conventional.

Storage device 304 stores one or more programs (at least some of which being indicated by blocks 310-318) for controlling processor 300. Processor 300 performs instructions of the programs, and thereby operates in accordance with aspects of the present invention. In some embodiments, the programs may include a program 310 that programs the telematics vendor computer 301 to receive, request, gather and/or store the telematics data generated by the sensors 106 (FIG. 1). The program 310 may be provided in accordance with conventional practices.

Another program stored on the storage device 304 is indicated at block 312 and is operative to program the telematics vendor computer 301 to analyze the telematics data received from the sensors 106. In some respects, the program 312 may be provided in a conventional manner, but in other respects (such as taking loss data into account), the program 312 may reflect aspects of the present invention as described herein.

Still another program stored on the storage device 304 is indicated at block 314. Program 314 may generate reports based on the analysis of the telematics data performed by program 312. These reports may, for example, be provided to the policy holder 104 pursuant to risk management service offerings jointly provided by the telematics vendor 110 and the managing general agency 112. In some respects the reports generated by the program 314 may be conventional; in other respects the reports may reflect aspects of the present invention.

Continuing to refer to FIG. 3, storage device 304 also stores a program 316, which operates to control the telematics vendor computer 301 to engage in data communications with other devices/computers. Program 316 may be constituted by conventional data communications software.

In addition, the storage device 304 may store a program 318, which controls the telematics vendor computer 301 to analyze data received by the telematics vendor computer 301 which relates to losses ceded by the primary insurer 114 to the captive reinsurance company 116.

There may also be stored in the storage device 304 other software, such as one or more conventional operating systems, database management software, device drivers, website hosting software, etc.

Still further, the storage device 304 may store a database 320 for storing and managing the telematics data received from the sensors 106. In addition, the storage device 304 may store a database 322 which contains reports generated by the report generation program 314 referred to above. Also, the storage device 304 may store a database 324 for storing and managing the ceded loss data referred to above in connection with the program 318.

Figure 3A:
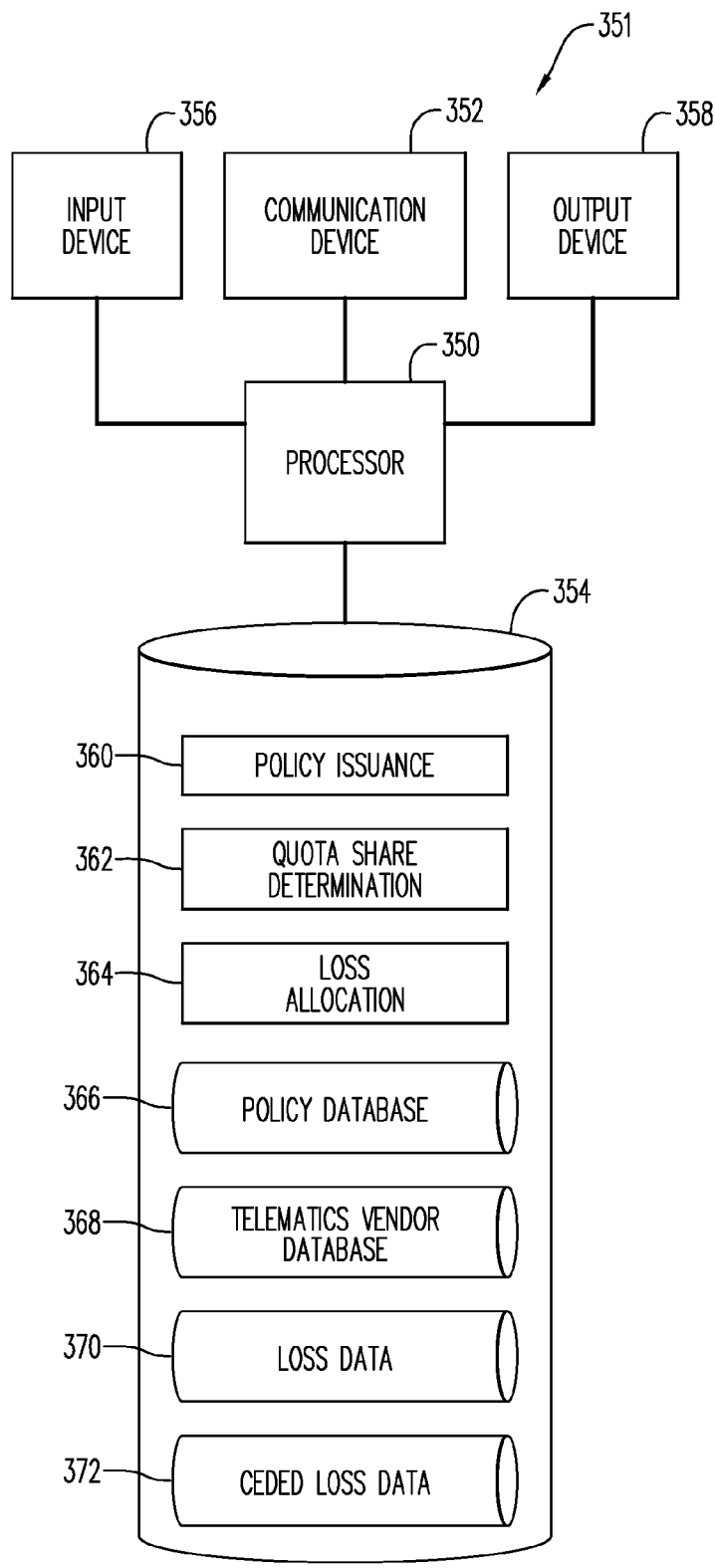
FIG. 3A is a block diagram representation of another computer that implements another portion of the system of FIG. 1.

FIG. 3A is a block diagram representation of a computer 351 operated by or on behalf of the insurer 114 (FIG. 1). Hereinafter, the computer illustrated in FIG. 3A will be referred to as the "insurance company computer 351".

The hardware architecture of the insurance company computer 351 may be conventional and may be the same as that of the telematics vendor computer 301 shown in FIG. 3. Thus, the above description of the hardware aspects of the telematics vendor computer 301 is equally applicable to the hardware aspects of the insurance company computer 351. Nevertheless, the following description is provided to summarize the hardware components of the insurance company computer 351.

The insurance company computer 351 may include a processor 350 that is in communication with a communication device 352, a storage device 354, an input device 356 and an output device 358. The storage device 354 may store an application program 360 which programs the insurance company computer 351 to perform functions relating to issuance of primary insurance policies. In addition, the storage device 354 stores an application program 362 which programs the insurance company computer 351 to assign quota shares in the primary policy in a manner that is described below. Further, the storage device 354 stores an application program 364 which programs the insurance company computer 351 to allocated losses incurred under the primary policies to parties to which quota shares have been assigned with respect to the policies.

The storage device 354 may further store a database 366 with respect to primary insurance policies issued by the insurer 114. Also, the storage device 354 may store a database 368 which stores information concerning one or more telematics vendors to which quota shares in the primary policies may be assigned. In addition, the storage device 354 may store a database 370 which contains data relating to losses incurred under the primary insurance policies, as well as a database 372 with respect to losses ceded by the insurer 114 under reinsurance treaties that are applicable to the primary insurance policies.

The storage device 354 may store other programs, such as one or more operating systems, device drivers, web hosting software, etc., and may also store one or more other databases relating to operations of the insurance company computer 351.

Figure 4:
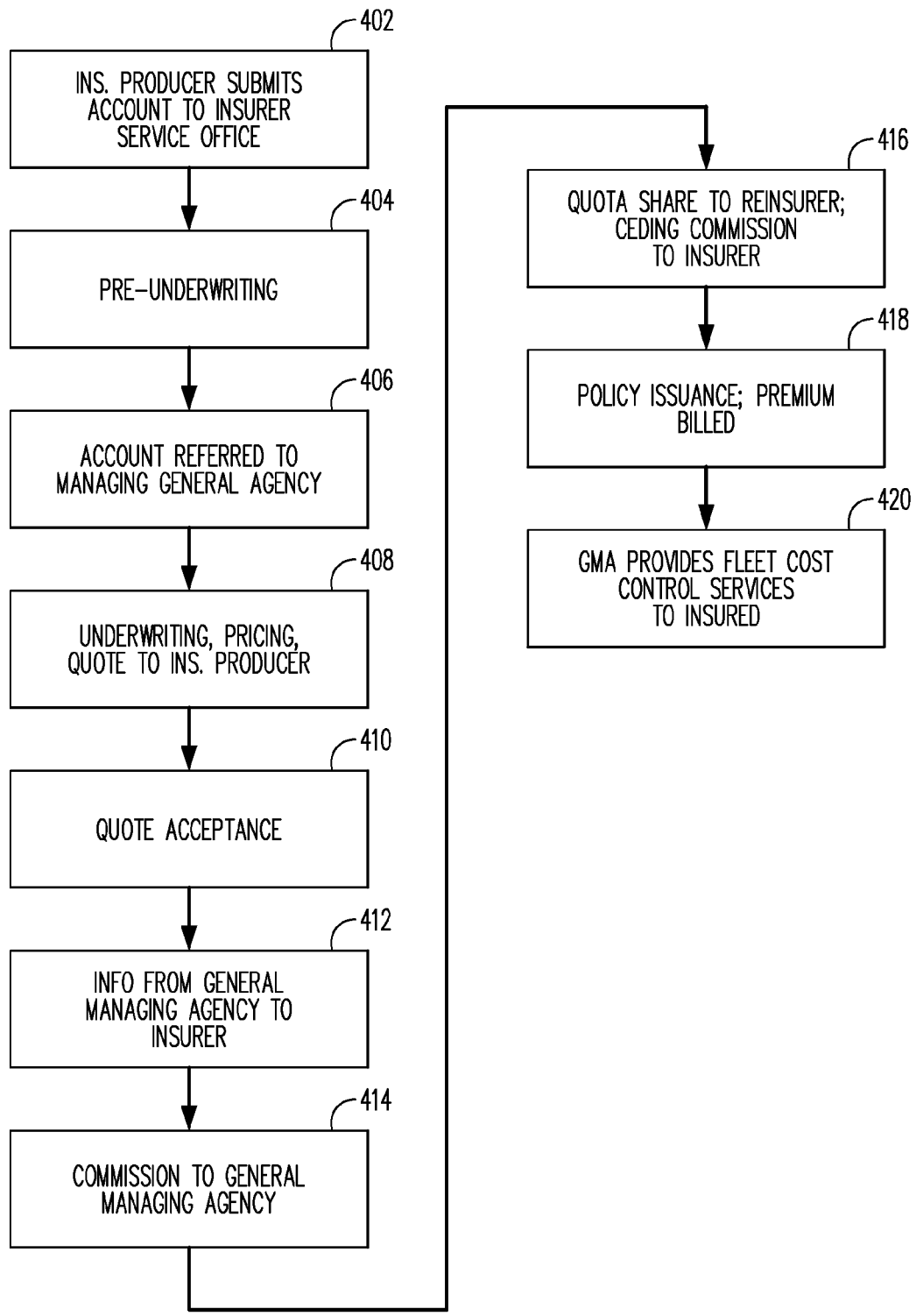
FIG. 4 is a flow chart that illustrates a process performed in the system of FIG. 1.

FIG. 4 is a flow chart that illustrates a business process flow performed in the system 100.

At 402 in FIG. 4, an insurance producer submits an account to a regional office or service center operated by the primary insurer 114. At 404, the primary insurer 114 performs pre-underwriting with respect to the account. (As is familiar to those who are skilled in the art, "pre-underwriting" may involve preliminary screening of the risk as to basic qualifications for possible coverage. For example, such screening may be automated or manual, and may identify major characteristics of the risk such as what kind of vehicle fleet is operated, how many vehicles, how old the company is, prior loss reports, etc.) The primary insurer 114 then refers the account to the managing general agency 112, as indicated at 406 in FIG. 4. Then, at 408, the managing general agency 112 underwrites and prices the account, and provides a quote to the insurance producer which submitted the account.

Block 410 in FIG. 4 represents acceptance of the quote by the proposed insured (policy holder 104, FIG. 1). Then, at 412, the managing general agency 112 provides information required for policy issuance to the primary insurer 114. At 414, the primary insurer 114 provides a commission to the managing general agency 112 (and the managing general agency 112 shares the commission with the insurance producer). At 416, the primary insurer 114 cedes a quota share of the insured risk to the captive reinsurance company 116. In connection with the cession, the captive reinsurance company 116 pays a ceding commission to the primary insurer 114.

Figure 4A:
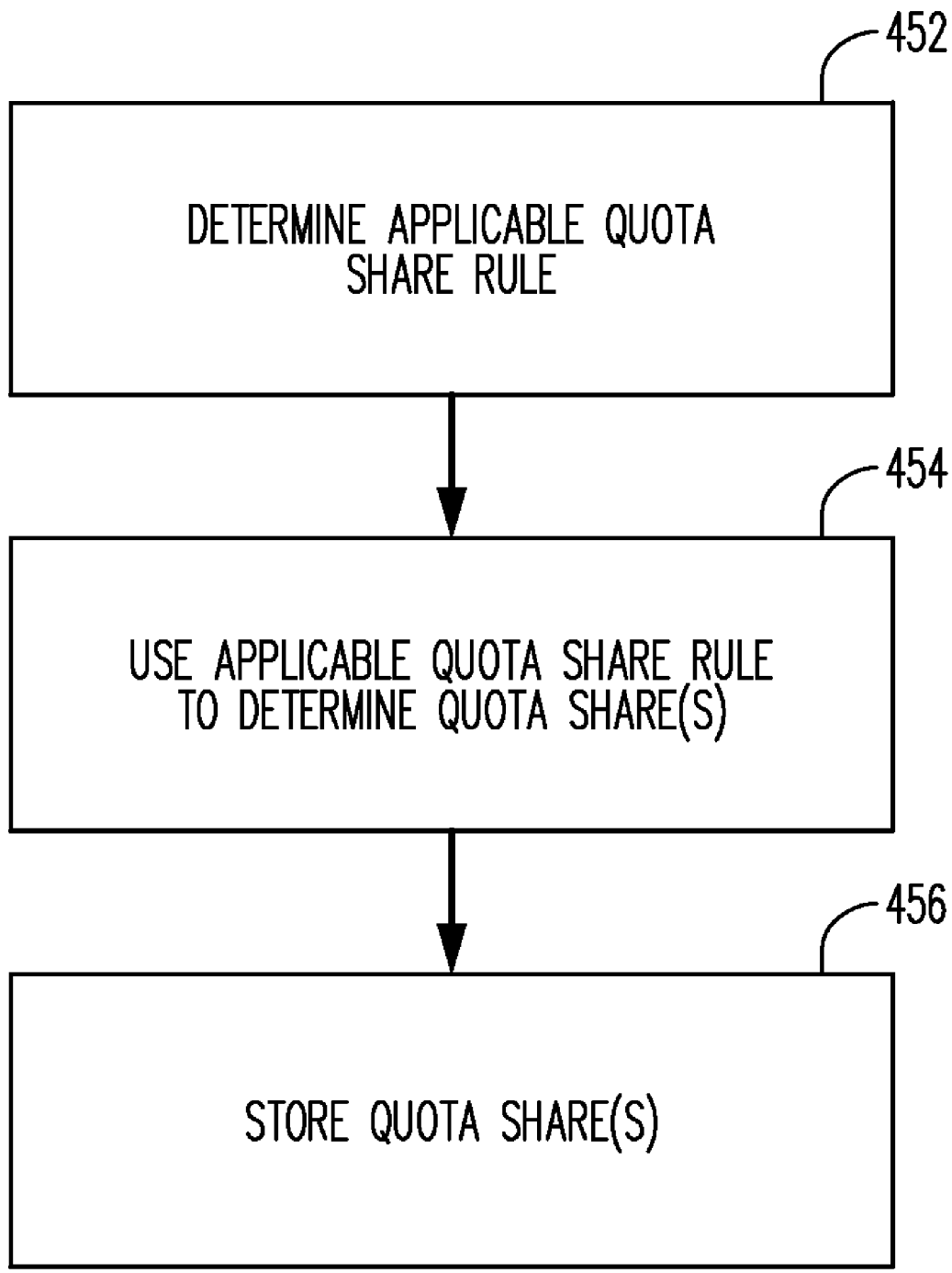
FIG. 4A is a flow chart that illustrates some details of the process of FIG. 4.

FIG. 4A is a flow chart that illustrates some details of step 416 in FIG. 4. At 452 in FIG. 4A, the insurance company computer 351 determines a rule that governs one or more quota shares to be assigned with respect to the primary policy. For example, according to some rules, the quota shares to be assigned are fixed in accordance with embodiments described above in connection with FIG. 2. In other embodiments, the rules may prescribe quota shares that vary depending on characteristics of the primary policy, and/or of the telematics vendor(s) involved, and or operations of the insured fleet of vehicles. For example, in some embodiments, where two or more telematics vendors hold interests in the captive reinsurer, the quota shares assigned may correspond to a percentage of telematics devices respectively supplied by each telematics vendor for the vehicles in the insured fleet. In another example, the rule may prescribe that the quota share assigned to the captive reinsurer may depend on the proportion of the insured fleet in which telematics devices are installed.

Continuing to refer to FIG. 4A, at 454 the insurance company computer 351 determines the quota shares to apply to the primary policy in accordance with the rule determined to be applicable at 452. Then at 456, the storage device 354 in the insurance company computer 351 stores the assigned quota shares. One or more reinsurance treaties with one or more captive reinsurers or segregated accounting cells are entered into to reflect the assigned quota shares.

Referring again to FIG. 4, at 418 the primary insurer 114 issues the policy, and bills the premium to the insured/policy holder 104. At 420, the managing general agency 112, in cooperation with the telematics vendor 110, provides fleet cost control services to the policy holder 104. In some cases, the fees for these services may be bundled with the premium billed to the policy holder 104. Alternatively, however, these services may be billed on an unbundled basis.

The processes and/or steps represented in FIG. 4 should be understood as being only examples of processes and/or steps that may be performed in accordance with embodiments of the invention. The invention is not limited to processes and/or steps represented in FIG. 4.

Figure 5:
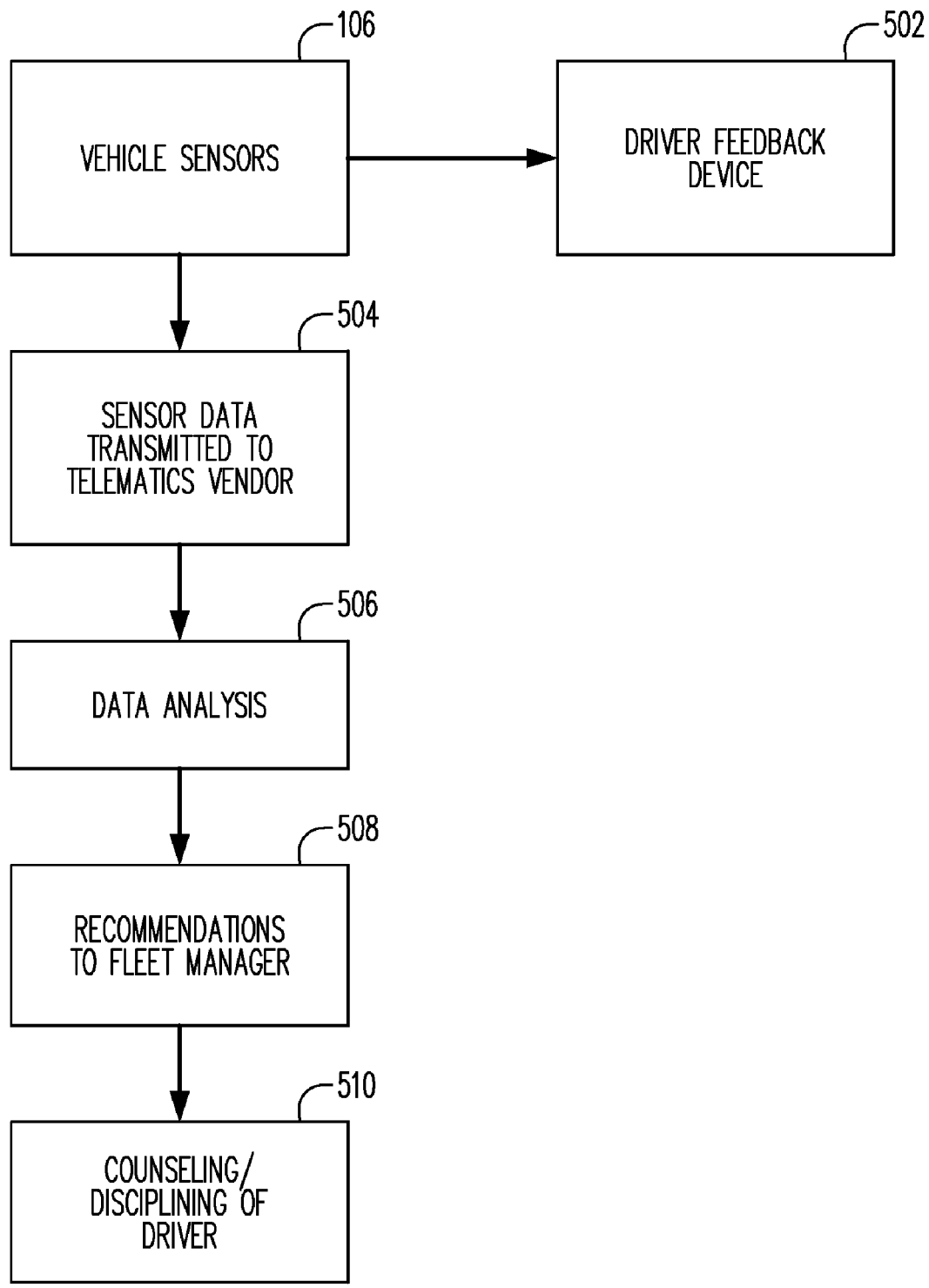
FIG. 5 is a block diagram/flow chart representation of aspects of the system of FIG. 1.

FIG. 5 is a block diagram/flow chart representation of aspects of the system 100, particularly related to telematics services provided by the telematics vendor 110.

Block 106 in FIG. 5 represents telematics sensors which detect one or more of use, location, and condition of a motor vehicle 102 (FIG. 1), and/or driver behavior at least insofar as the driver behavior is expressed in operation of the vehicle 102. Block 502 in FIG. 5 represents one or more driver feedback devices which are coupled to at least some of the sensors 106 and which are driven by at least some telematics data to provide feedback at appropriate times to the driver of the vehicle 102. For example, the driver feedback device 502 may include a red display lamp (not separately shown in FIG. 5) installed on or near the dashboard of the vehicle. The display lamp may be illuminated in response to the sensors 106 detecting one or more of excessive acceleration, deceleration, braking, abrupt maneuvering, etc. The illumination of the display lamp may function as feedback to the driver to indicate to the driver that he/she has operated/is operating the vehicle in a manner that increases risk of loss.

Figure 5A:
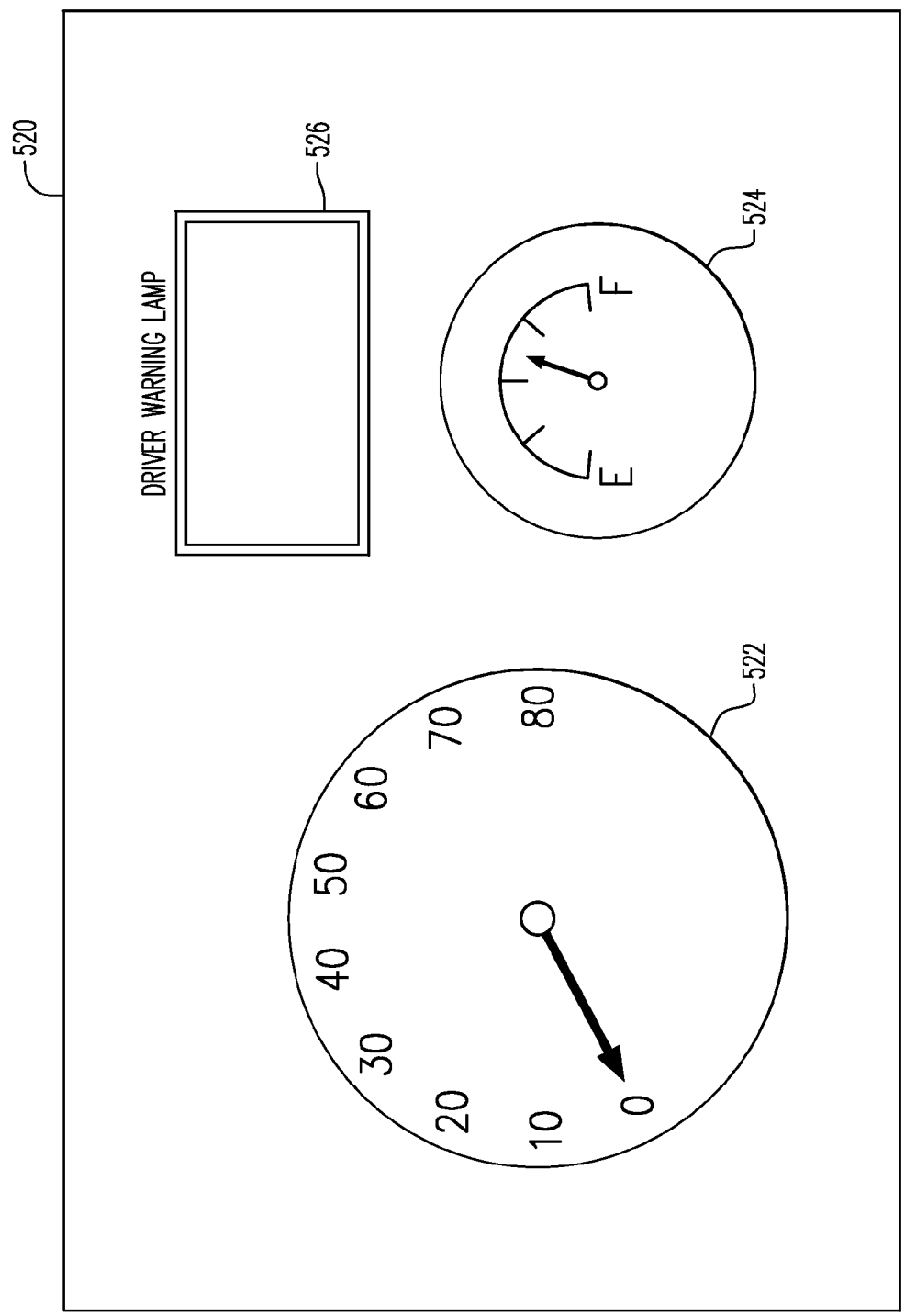
FIG. 5A is a simplified schematic view of a vehicle dashboard as provided in one of the vehicles represented in FIG. 1.

FIG. 5A is a simplified schematic view of a vehicle dashboard 520 as provided in one of the vehicles 102 represented in FIG. 1. Shown in FIG. 5A are a conventional speedometer 522, fuel gauge 524 and the above-mentioned display lamp, indicated at 526.

Figure 5B:
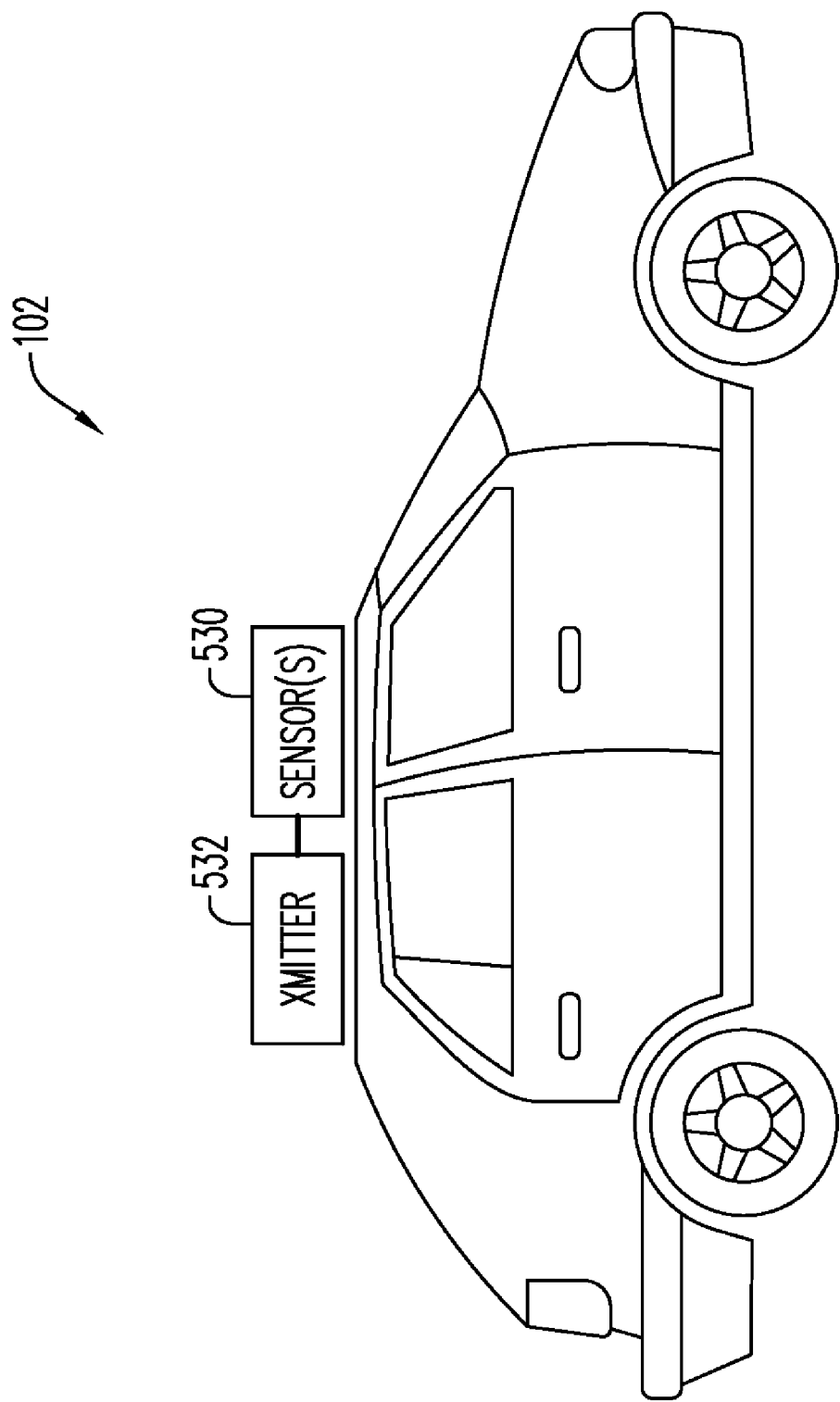
FIG. 5B is a schematic side view of one of the vehicles represented in FIG. 1.

FIG. 5B is a schematic side view of a typical one of the vehicles 102 represented in FIG. 1. Block 530 in FIG. 5B indicates one or more of the above-described telematics sensors which are installed in the vehicle 102. Block 532 represents circuitry which is responsive to the sensors 530 and which transmits telematics sensor data to the telematics vendor 110 (FIG. 1).

The sensors 106 and driver feedback device 502 indicated in FIG. 5 may be constructed and may operate in a substantially conventional manner. In addition or as an alternative to the display lamp, the vehicle may include an audible alarm and/or a heads up display.

At 504 in FIG. 5, at least some of the telematics data generated by the sensors 106 is transmitted to the telematics vendor computer 301 (FIG. 3) operated by the telematics vendor 110 (FIG. 1). Then, at 506, the telematics vendor computer 301 analyzes the telematics data transmitted to it at 504. This may, for example, occur in several stages. For example, an initial analysis may be performed in accordance with conventional practices, including for identification of patterns of use of the vehicle 102 that may be relevant to risk management, fuel management, maintenance cost management, etc. Subsequent analysis may then be performed to reflect ceded loss data provided either directly to the telematics vendor computer 301 or indirectly via the captive reinsurance company 116.

At 508, the telematics vendor 110 may use the results of the analysis of the telematics data to generate one or more recommendations provided to the policy holder 104 by the telematics vendor 110 and/or by the managing general agency 112. In line with such recommendations, the policy holder 104 may engage in activities (block 510, FIG. 5) to counsel the driver of the vehicle 102 and/or to discipline the driver in a manner designed to improve the driver's behaviors in operating the vehicle 102. The ability to identify specific behaviors and target those behaviors for training and modification may result in a reduction of losses under the insurance policy and more opportunity for profit than the insurer, reinsurer, and/or safety vendor would otherwise have had.

The safety vendor can take the additional data obtained from the insurer and reinsurer (actual loss reports, motor vehicle reports, credit scores, etc.) and combine them with the data it generates from the devices allowing the safety vendor to cross reference the telematics sensor data and analytics to improve the functionality of the telematics system.

The safety vendor can then employ the improved telematics system, thereby creating a learning loop complete with real world experience to further develop the telematics technology.

Figure 6:
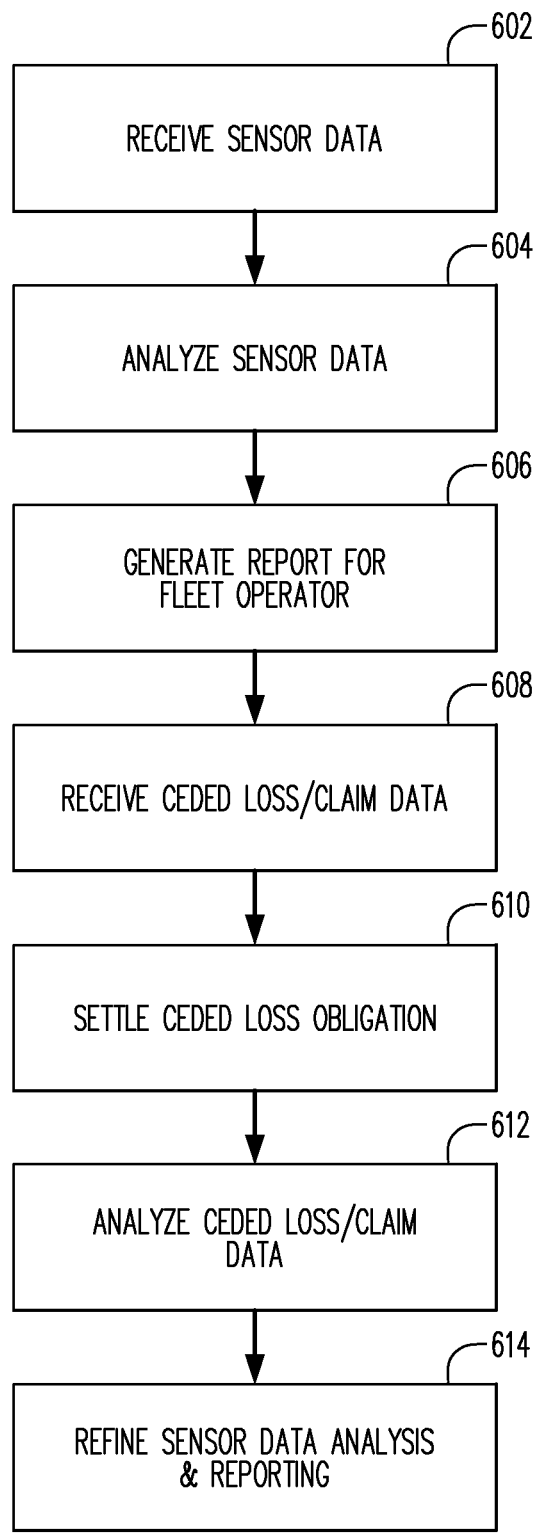
FIG. 6 is a flow chart that illustrates a process that may be performed in accordance with aspects of the present invention by the computer depicted in FIG. 3.

FIG. 6 is a flow chart that illustrates a process that may be performed in accordance with aspects of the present invention by the telematics vendor computer 301 depicted in FIG. 3.

At 602 in FIG. 6, the telematics vendor computer 301 receives the telematics data generated and transmitted by the sensors 106 (FIG. 1). Continuing to refer to FIG. 6, at 604, the telematics vendor computer 301 analyzes the telematics data received at 602. For example, the telematics vendor computer 301 may analyze the telematics data in a conventional manner to identify patterns of use of the vehicle 102 that may be relevant to risk management, fuel management, maintenance cost management, etc. Then, at 606, and based on the telematics data analysis at 604, the telematics vendor computer 301 generates one or more reports for the policy holder/fleet operator 104 (FIG. 1) to inform the policy holder 104 of any significant results of the analysis of the telematics data. The report may, for example, provide information that indicates or describes driving behaviors of drivers of the vehicle 102. The report may be provided directly from the telematics vendor computer 301 to the policy holder 104 (e.g., via data communication from the telematics vendor computer 301 to a computer (not separately shown) operated by the policy holder 104). Alternatively, the report or key points from the report may be provided to the policy holder 104 via comprehensive risk management/fleet management services provided to the policy holder 104 by the managing general agency 112 in cooperation with the telematics vendor 110.

At 608, the telematics vendor computer 301 receives data indicative of one or both of (a) loss amounts allocated to the captive reinsurance company 116 (and consequently to the telematics vendor 110 through its ownership interest in the captive reinsurance company 116) in connection with risks ceded to the telematics vendor 110 pursuant to the reinsurance treaty 204 (FIG. 2); and (b) claims made/losses experienced under the primary policies that were subject to the reinsurance treaty 204. It will be appreciated that the types of data (a) and (b) referred to in the previous sentence may overlap or be one and the same. The telematics vendor computer 301 may receive this data directly from the primary insurer 114 (i.e., from a computer—not separately shown—that is operated by or on behalf of the primary insurer). In addition, or alternatively, the telematics vendor computer 301 may receive this data indirectly, via a computer (not separately shown) that is operated by or on behalf of the captive reinsurance company 116, the data having originated with the primary insurer 114.

At 610, the captive reinsurance company 116 settles its reinsurance obligation to the primary insurer in regard to the losses allocated to the captive reinsurance company 116 in connection with the ceded risks. This may be done in a conventional manner.

Figure 7:
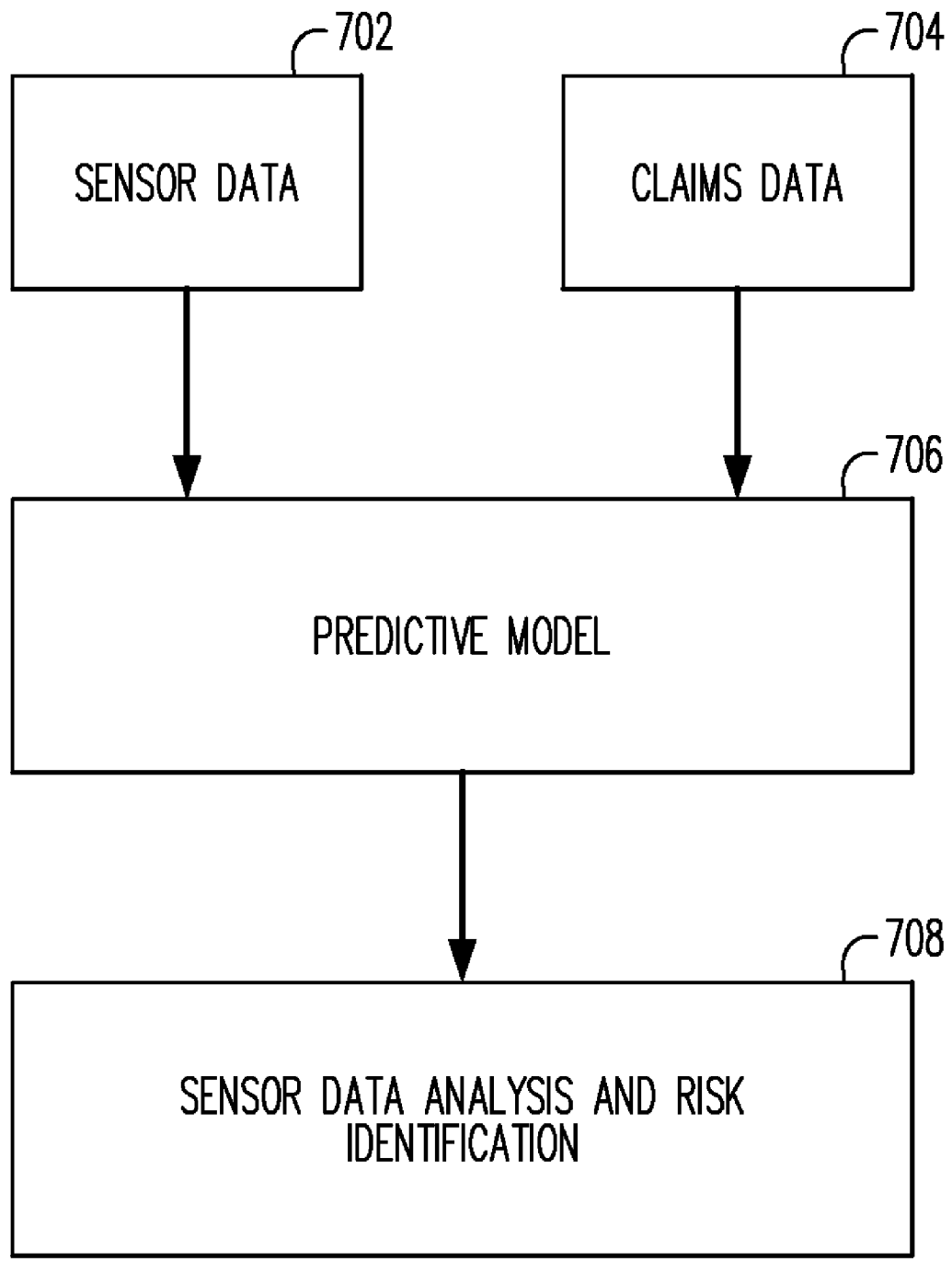
FIG. 7 graphically illustrates aspects of the process depicted in FIG. 6.

At 612, the telematics vendor computer 301 analyzes the loss/claim data received at 608. A purpose of this analysis may be to detect patterns of vehicle operation that are correlated with increased risk/incidence of claims under the fleet insurance policy. For example, as illustrated in FIG. 7, the telematics vendor computer 301 may apply telematics data 702 (received at 602 in FIG. 6) and claims/loss data 704 (received at 608 in FIG. 6) to train a predictive model represented at 706 in FIG. 7. The predictive model 706 may be implemented as a neural network or with another conventional technique. The telematics vendor computer 301 may use the resulting trained predictive model to analyze telematics data that is subsequently received by the telematics vendor computer 301 in order to identify risks involved in driver behavior/vehicle usage represented by the telematics data, as represented by block 708 in FIG. 7. The refinement of the telematics data analysis by the telematics vendor computer 301, as depicted in FIG. 7, is indicated at block 614 in FIG. 6.

The current state of the telematics art excludes information that is not generated by the device installed in the vehicle. Data on actual crashes, damage to vehicles, claims of negligence and other law suits brought against a driver or employer, motor vehicle reports, police reports, loss control consultant's training, ranking and scoring of drivers, etc. are not available to the telematics provider but are contained and collected by insurer loss control consultants, the employer, and government agencies like the registry of motor vehicles and police departments. This information collectively may be referred to as "loss control data". In accordance with aspects of the present invention, and in order to generate an accurate predictive model, the telematics data is correlated with the loss control data to provide a complete picture of incidents, driver behavior, severity of incidents, and overall driver and fleet safety. For example, the telematics device may register a small change in g-force applied to the vehicle and register the incident as minor based on the raw accelerometer data as processed by the telematics algorithms and computer models. This incident is then correlated with the accident reports, the liability claims and police reports which yields a result that, although the accelerometer register a small amount of g-force, the vehicle made contact with a pedestrian causing injury. The correlated data (telematics data plus loss control data) creates an enhanced incident and driver profile that more accurately depicts driver incidents and ultimately risk, which, allows for a more focused training of drivers, enhanced underwriting and more accurate predictive computer models.

In some embodiments, reports and/or data generated in the system 100 may be useful for benchmarking fleet operators against each other with respect to risk management and/or cost management.

In some embodiments, the fleet cost control services provided to the fleet operators may incorporate risk management as to fuel costs. For example, fleet operators may be permitted to participate in group purchasing of fuel and/or hedging.

In some embodiments, either a primary insurer, or a derivative risk transfer product can protect the fleet operator against unexpected movements in the cost of fuel, which is then reinsured through the reinsurance mechanism transferring some of the exposure to a safety or fuel management vendor.

In some embodiments, the telematics data may be provided to the primary insurer and may be analyzed by the primary insurer for the purpose of repricing the policy at intervals (e.g., weekly or monthly) during the term of the policy.

Up to this point, the invention has been described primarily in the context of commercial vehicles, and particularly with respect to motor-freight vehicles or fleets. Nevertheless, the invention can also be readily applied in the context of other types of commercial vehicles, such as buses, taxis, limousines and tow trucks. The invention is also applicable to fleets of aircraft or watercraft as well as land vehicles.

Still further, the invention is applicable to systems in which sensors are carried by human beings whose work activities such as lifting items are to be tracked or monitored for the purpose of detecting potentially unsafe modes of job performance. Thus the term "moving bodies" as used in the appended claims, refers to vehicles as well as human beings whose movements are tracked by sensors. The primary insurance policies involved in the latter embodiments may provide workers compensation coverage.

Generally, up to this point in this disclosure, the invention has been described with reference to one or more telematics vendors that have an interest in a captive reinsurance company. However, the principles of the invention may be applied more generally to safety vendors other than or in addition to telematics vendors. The term "safety vendor" refers not only to telematics vendors, but also to suppliers of vehicle parts that improve the vehicle's safety performance, contractors who provide safety consulting and/or training and/or employee motivation and/or employee evaluation services to the insureds, and/or contractors who provide safety-enhancing painting services for vehicles.

In portions of the disclosure provided herein, it is mentioned that the telematics vendor may co-analyze the telematics data and loss/claim data with a view to refining reports on telematics data and/or risks that may be detected via telematics. In addition or alternatively, co-analysis of telematics data and loss/claim data may be performed by the primary insurer, based on telematics data the primary insurer receives from the telematics vendor.

In example embodiments disclosed above, the primary insurance is property and/or casualty insurance or workers compensation insurance. However, the primary insurance may be any kind of insurance, including e.g. life insurance (e.g., life insurance the drivers of a fleet of vehicles). Moreover, as used herein, the term "insurance" should be understood to include all insurance or risk transfer products, including hedges, swaps, etc.

Example embodiments disclosed above involve a captive reinsurer, but in alternative embodiments, the reinsurer is not a captive, but is wholly or partly owned by a safety vendor.

Any services described herein as being performed by the managing general agent may in addition or alternatively be performed by the primary insurer(s).

The process descriptions and flow charts contained herein should not be considered to imply a fixed order for performing process steps. Rather, process steps may be performed in any order that is practicable.

As used herein and in the appended claims, the term "computer" refers to a single computer or to two or more computers in communication with each other and/or operated by a single entity or by two or more entities that are partly or entirely under common ownership and/or control.

As used herein and in the appended claims, the term "processor" refers to one processor or two or more processors that are in communication with each other.

As used herein and in the appended claims, the term "memory" refers to one, two or more memory and/or data storage devices.

As used herein and in the appended claims, an "entity" refers to a single company or two or more companies that are partly or entirely under common ownership and/or control.

As used herein and in the appended claims, "losses" refer to events that result in damage, injury and/or liability covered by an automobile or fleet insurance policy or by a workers compensation insurance policy.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. An automated data processing system comprising:
   a communication device;
   a processor coupled to the communication device;
   a storage device in communication with said processor, the storage device storing instructions adapted to be executed by said processor for:
      determining percentage shares to assign relative risk in a telematics based insurance pool between an insurer and one or more participating third party monitoring device providers, wherein the percentage shares for the one or more participating third party monitoring device providers are determined based at least in part on a percentage of monitoring devices deployed by at least one of the third party monitoring device providers;
      allocating portions of the insurance pool among the insurer and the one or more third party monitoring device providers according to the determined percentage shares assigned to the insurer and the one or more third party monitoring device providers;
      aggregating, by the insurer, telematics related loss information related to the monitoring devices deployed;
      transmitting, via said communication device, the telematics related loss information to the third party monitoring device providers; and
      allocating portions of a claim liability or a received premium associated with the insurance pool among the insurer and the one or more participating third party monitoring device providers according to the determined percentage shares assigned to the insurer and the one or more participating third party monitoring device providers; and
   a memory for storing the determined percentage shares assigned to the insurer and the one or more participating third party monitoring device providers.

2. The data processing system of claim 1, wherein the monitoring devices are installed in motor vehicles.

3. The data processing system of claim 1, wherein the monitoring devices are attached to human bodies.

4. The data processing system of claim 1, wherein the memory stores information indicative of a proportion of a vehicle fleet in which the monitoring devices are deployed by one of said third party monitoring device providers, the processor determining the percentage shares based at least in part on said information.

5. The data processing system of claim 1, wherein the memory stores information indicative of a size of a first vehicle fleet which deploys monitoring devices supplied by a first one of said third party monitoring device suppliers and information indicative of a size of a second vehicle fleet which deploys monitoring devices supplied by a second one of said third party monitoring device suppliers, the processor determining the percentage shares based at least in part on said information.

6. A method, comprising:
   determining, by a computer processor, percentage shares to assign relative risk in a telematics based insurance pool between an insurer and one or more participating third party monitoring device providers, wherein the percentage shares for the one or more participating third party monitoring device providers are determined based at least in part on a percentage of monitoring devices deployed by at least one of the third party monitoring device providers;
   allocating, by the computer processor, portions of the insurance pool among the insurer and the one or more third party monitoring device providers according to the determined percentage shares assigned to the insurer and the one or more third party monitoring device providers;
   aggregating, by the insurer, telematics related loss information related to the monitoring devices deployed;
   transmitting the telematics related loss information to the third party monitoring device providers; and
   automatically allocating, by the computer processor, portions of a claim liability or a received premium associated with the insurance pool among the insurer and the one or more participating third party monitoring device providers according to the determined percentage shares assigned to the insurer and the one or more participating third party monitoring device providers.

7. The method of claim 6, wherein the monitoring devices are installed in motor vehicles.

8. The method of claim 6, wherein the monitoring devices are attached to human bodies.

9. The method of claim 6, further comprising:
determining information indicative of a proportion of a vehicle fleet in which the monitoring devices are deployed by one of said third party monitoring device providers, wherein the percentage shares are determined based at least in part on said information.

10. The method of claim 6, further comprising:
determining information indicative of a size of a first vehicle fleet which deploys monitoring devices supplied by a first one of said third party monitoring device suppliers and information indicative of a size of a second vehicle fleet which deploys monitoring devices supplied by a second one of said third party monitoring device suppliers, wherein the percentage shares are determined based at least in part on said information.

11. A non-transitory computer-readable medium storing instructions that, when executed by a processor, result in the performance of a method, the method comprising:
determining percentage shares to assign relative risk in a telematics based insurance pool between an insurer and one or more participating third party monitoring device providers, wherein the percentage shares for the one or more participating third party monitoring device providers are determined based at least in part on a percentage of monitoring devices deployed by at least one of the third party monitoring device providers;
allocating portions of the insurance pool among the insurer and the one or more third party monitoring device providers according to the determined percentage shares assigned to the insurer and the one or more third party monitoring device providers;
aggregating, by the insurer, telematics related loss information related to the monitoring devices deployed;
transmitting the telematics related loss information to the third party monitoring device providers; and
automatically allocating portions of a claim liability or a received premium associated with the insurance pool among the insurer and the one or more participating third party monitoring device providers according to the determined percentage shares assigned to the insurer and the one or more participating third party monitoring device providers.

12. The medium of claim 11, wherein the monitoring devices are installed in motor vehicles.

13. The medium of claim 11, wherein the monitoring devices are attached to human bodies.

14. The medium of claim 11, further comprising:
determining information indicative of a proportion of a vehicle fleet in which the monitoring devices are deployed by one of said third party monitoring device providers, wherein the percentage shares are determined based at least in part on said information.

15. The medium of claim 11, further comprising:
determining information indicative of a size of a first vehicle fleet which deploys monitoring devices supplied by a first one of said third party monitoring device suppliers and information indicative of a size of a second vehicle fleet which deploys monitoring devices supplied by a second one of said third party monitoring device suppliers, wherein the percentage shares are determined based at least in part on said information.

* * * * *